US005954315A

United States Patent [19]
Lambert

[11] Patent Number: 5,954,315
[45] Date of Patent: Sep. 21, 1999

[54] HYDRAULIC SPRING COMPRESSOR

[75] Inventor: Patrick Lambert, Courtenay, France

[73] Assignee: Mecanique Energertique, Egreville, France

[21] Appl. No.: 09/194,736

[22] PCT Filed: Jun. 3, 1997

[86] PCT No.: PCT/FR97/00963

§ 371 Date: Dec. 2, 1998

§ 102(e) Date: Dec. 2, 1998

[87] PCT Pub. No.: WO97/46442

PCT Pub. Date: Dec. 11, 1997

[30] Foreign Application Priority Data

Jun. 3, 1996 [FR] France ................................. 96 06805

[51] Int. Cl.⁶ ................................................ B60P 1/48
[52] U.S. Cl. ............................ 254/10.5; 29/215; 29/225; 29/226; 29/227
[58] Field of Search ............................... 254/10.5, 93 R; 29/215, 225, 226, 227

[56] References Cited

U.S. PATENT DOCUMENTS

| 2,893,719 | 7/1959 | Gattiker, Jr. et al. ................. 254/10.5 |
| 4,034,960 | 7/1977 | Kloster . |
| 4,105,188 | 8/1978 | Mendoza et al. . |
| 5,564,172 | 10/1996 | Klann . |

FOREIGN PATENT DOCUMENTS 0398815  11/1990  European Pat. Off. .

*Primary Examiner*—Timothy V. Eley
*Assistant Examiner*—Benjamin M. Halpern
*Attorney, Agent, or Firm*—Griffin, Butler, Whisenhunt & Szipl, LLP

[57] ABSTRACT

A spring-compressor device comprises a body having at least two telescopic parts (1, 4, 7) fitted with respective coupling means (2, 9) for jaws (3, 10), and including means internal to the body for controlling lengthening or shortening thereof. The innermost part (7) of the body is constituted by the body of a single-acting actuator whose rod (11) which is secured to the piston (12) of the actuator is fixed to the outermost part (1) of the body and is provided with a duct (14) for feeding the chamber (13) of the actuator whose increase in volume tends to retract the body of the compressor.

3 Claims, 3 Drawing Sheets

FIG_1

HYDRAULIC SPRING COMPRESSOR

In the field of mounting and dismounting motor vehicle shock absorber springs, drive mechanisms constituted by actuators are used which move apart or towards each other two jaws or cups that are placed facing each other and between which the turns of the spring are engaged.

BACKGROUND OF THE INVENTION

In most cases, the actuator used is a screw actuator and the body can be in two telescopic portions. The larger-diameter portion carries a screw that is prevented from moving in translation relative to the said portion while the smaller-diameter portion carries a nut, said portion being prevented from rotating relative to the larger-diameter portion. By driving the screw via the end of the actuator body, it is thus possible to extend or to retract the body, and thus to move the cups which are fixed thereto either away from or towards each other.

There also exist fluidized pressure actuators that can be single-acting or double-acting, for providing the above relative displacement. Particular mention can be made of the actuator described in document U.S. Pat. No. 4,034,960. In that document, the spring-compressor has two actuators side by side, each having a fixed piston and a moving cylinder, one cup being secured to the moving cylinder of each the actuators, while another cup is carried by a plate which is fixed relative to the piston and which is secured to a guide tube for guiding each of the moving cylinders relative to the piston. The presence of the two actuators side by side is necessary firstly to enable sufficient compression force to be developed, given that the device is a pneumatic device, and secondly to provide rectilinear guidance for the moving cup relative to the fixed cup so as to oppose the tendency of the spring to tilt one cup relative to the other. Finally, the forces involved are such that to oppose buckling, the cylinder of each pneumatic actuator must remain well within the corresponding guide tube when the device is at its maximum extension. This means that the axial size of the apparatus is large for given stroke. All of those reasons that give rise to large bulk mean that that apparatus is ill-adapted, particularly to taking action beneath a motor vehicle body when changing or repairing a shock absorber.

OBJECTS AND SUMMARY OF THE INVENTION

The present invention relates to a pressurized fluid actuator, in particular a hydraulic fluid actuator, that makes it possible with an operating pressure of the order of a few hundred bars, to provide an apparatus that is small in diameter (about 60 mm). In addition, the device is designed to present minimum longitudinal size for given compression stroke.

To this end, the invention thus provides a hydraulic spring-compressor comprising a body formed by a first tubular part closed at one of its ends by an end wall in which there is received the end of a hollow rod extending axially inside the first tubular part and whose other end is shaped to form a piston, and by a second tubular part having an end closed by an end wall through which the hollow rod passes, which second tubular part is mounted to slide in sealed manner on the rod and the piston, defining therebetween a chamber of variable volume that is continuously in communication with the inside volume of the hollow rod, the first tubular part having on its outside surface, at its end remote from the end wall, attachment means for attaching to a compression cup, the second tubular part having on its outside surface, at its end remote from its end wall, attachment means for attachment to a compression cup. In order to obtain minimum size for the device, the hollow rod is longer than the first tubular part so that its piston-shaped end is situated beyond the attachment means carried by the first tubular part, the closed end of the second tubular part is situated outside the attachment means of the first tubular part when the variable volume chamber is at its minimum volume, a link sleeve is slidably mounted between the first and second tubular parts respectively on the inside and outside surfaces thereof, and a key and keyway assembly is interposed between the second part and the sleeve to guide respective longitudinal sliding thereof and to form shoulders that come into contact with each other to entrain the sleeve axially by the second part when the variable volume chamber has exceeded a determined longitudinal size.

By means of this disposition, the moving part of the compressor which carries the moving cup can take up a first position in which said moving cup is adjacent to the cup carried by the compressor body, the moving part (with the exception of the attachment means) then being fully received inside said body, and a second position in which the moving cup is at a distance from the cup carried by the body of the compressor, the part carrying said moving cup being completely outside the body of the compressor. In this position, mutual guidance of the compressor is provided with its telescopic parts and with resistance to buckling by the sleeve which is interposed between the moving part and the body of the compressor.

In order to prevent the cups from rotating relative to each other at that time, the sleeve or the first part has a longitudinal groove in which there is received a radial finger carried by the first part or the sleeve, respectively.

In a particular embodiment of the invention, the end wall of the second tubular part through which the rod passes is formed by a nut screwed internally to the end of said second part and possessing a collar for bearing against an end face of said part into which there opens out a longitudinal groove formed in the outside of the second tubular part, said collar constituting the above-mentioned shoulder for driving a radial key carried in fixed manner by the sleeve and mounted to slide in the groove.

BRIEF DESCRIPTION OF THE DRAWINGS

Other characteristics and advantages of the invention appear from the following description of an embodiment thereof. Reference is made to the accompanying drawings, in which.

MORE DETAILED DESCRIPTION

Figure 1:
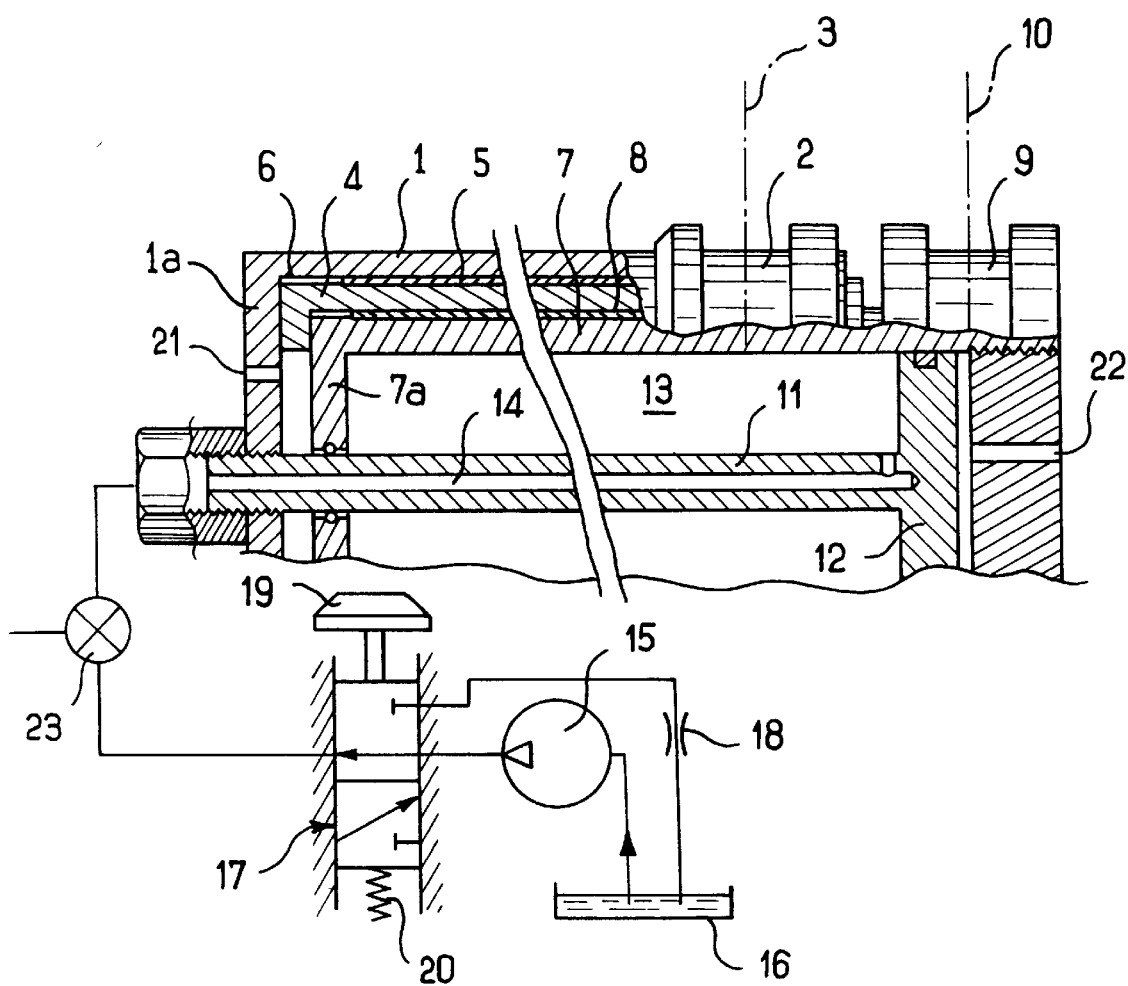
FIG. 1 is a diagram showing the principle on which the invention operates.

The hydraulic spring-compressor comprises a body which in this case is made up of three telescopic portions. A first portion is formed by a tubular segment 1 which is closed at one of its ends by an end wall 1a and which, at its opposite end, carries conventional means 2 for attachment of a spring-compression cup or jaw represented by chain-dotted line 3.

A sleeve 4 is slidably mounted inside the tubular portion 1. It carries a key 5 which prevents the sleeve 4 from rotating relative to the tubular portion 1 by cooperating with a keyway 6 formed in the inside cylindrical surface of the portion 1.

Inside the intermediate sleeve 4, the body has a second tubular portion 7 of smaller diameter which is slidably mounted inside the sleeve 4 and which is secured relative thereto by means of a key 8. This portion 7 is of a length such that it possesses one end held outside the outer tubular portion 1, said external end being fitted with conventional means 9 for attachment of a second spring-compression cup or jaw represented by chain-dotted line 10.

The internal tubular portion 7 forms the cylinder of an actuator whose rod 11 passing through the end wall 1a of the tubular portion 1 carries at its end remote from its end fixed to the end wall 1a, a piston 12 on which the cylinder 7 is mounted to slide in leakproof manner. The end of the tubular portion 7 that is inside the portion 1 is closed by an end wall 7a through which the rod 11 passes in leakproof manner. Between them, the rod 11, the piston 12, and the cylinder 7 define a chamber 13 of variable volume which can be connected via a duct 14 formed inside the rod 11 and opening out immediately behind the piston 12, either to a source of fluid under pressure 15 or else to a liquid return vessel 16. Which particular connection is selected is determined by a monostable valve 17 whose stable position puts the chamber 13 into communication with the return vessel 16 via a constriction 18. The chamber 13 is fed by acting on the slide of the valve 17 by means of a control knob 19 which acts against a return spring 20. Finally, in this figure it will be observed that vents 21 and 22 are provided respectively in the end wall 1a of the body and in an end wall of the cylinder 7 (which may be constituted merely by a plug).

When the device of the invention is used for removing a shock absorber spring, the jaws are initially engaged with the turns of the spring that is to be compressed. The operator then acts on the compressor by hand to move the means 2 and 9 apart from each other so as to place them facing the jaws which are already in place. The actuator body is thus extended with the fluid previously contained in the chamber 13 escaping via the channel 14 to the return vessel 16. Once coupling has been achieved, the operator acts on the knob 19 of the valve 17 to cause fluid to be fed to the chamber 13. This increases the volume of the chamber, thereby retracting the body of the compressor and thus bringing its jaws 3 and 10 towards each other, thereby compressing the spring that is to be removed. Once the spring has been compressed sufficiently to enable it to be removed, the operator isolates the chamber 13 from the outside by acting on a previously-open closure valve 23. Subsequently, the spring is expanded by reopening the valve 23 after releasing the valve 17 so that the fluid contained in the chamber 13 is expelled therefrom via the duct 14 under drive from the spring against the jaws 3 and 10 which tend to extend the compressor body, with the rate of such extension being restricted by the presence of the constriction 18 on the fluid exhaust channel. Maximum extension of the actuator body is obtained when the end wall 7a comes into the vicinity of the piston 12, but without masking the opening of the duct 14 into the chamber 13.

Figure 2:
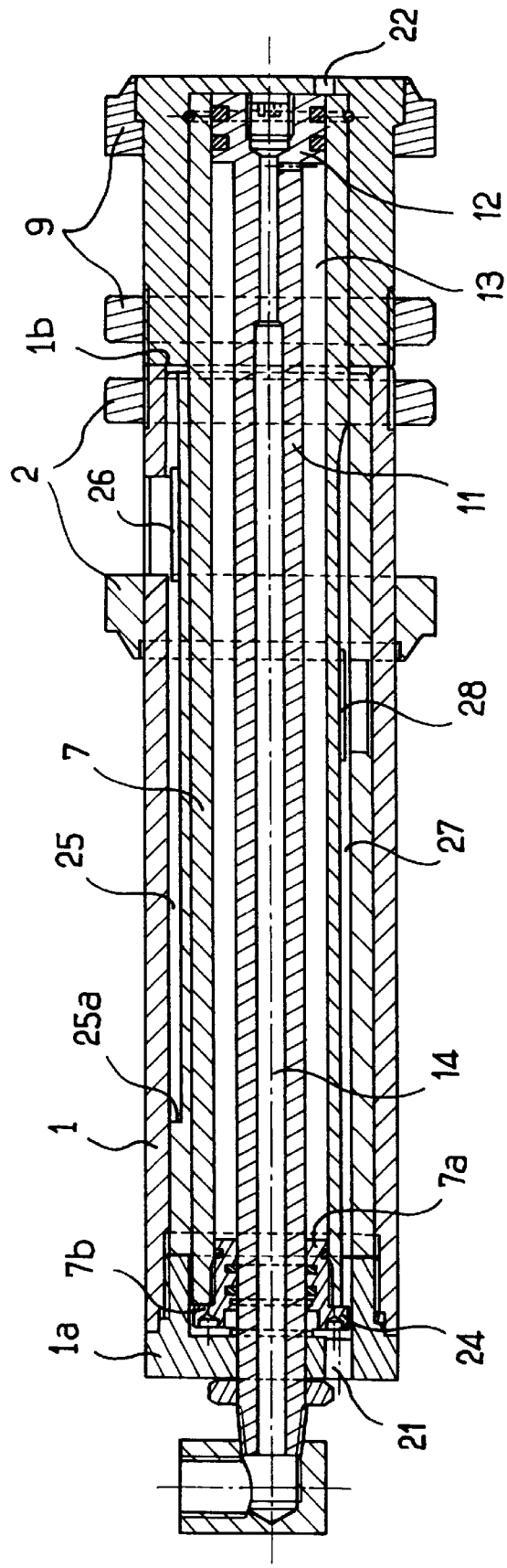
FIG. 2 is an axial section view of a preferred embodiment of the invention.

In FIG. 2 is an axial section through a practical embodiment of the hydraulic compressor of the invention and it shows certain elements as described above with the same references. In this figure, the compressor is shown in its retracted state. In this state, it can be seen that the piston 12 is housed inside the end-most portion of the second tubular part 7, i.e. the part which is in the vicinity of its end fitted with the cup attachment means 9. The piston 12 thus projects considerably from the end of the outer tubular body 1 which terminates in the face 1b against which the cup attachment means 9 carried by the sliding portion 7 bear when the compressor is retracted.

At its end remote from the means 9, the tubular portion 7 thus includes the end wall 7a through which the rod 11 passes. This end wall 7a is implemented by a nut screwed inside the end of the portion 7 and bearing against its end face by means of a collar 24. In this figure, the parts 1, 4, and 7 are indexed angularly and are guided in longitudinal sliding in the following manner. The sleeve 4 has an outside groove 25 defined by an end 25a that is furthest inside the compressor and opening out freely at the other end of the sleeve 7. The tubular part 1 has a key 26 which is merely received in a radial orifice formed in the part 1 and which possesses a rod projecting from the inside surface of said part 1 so as to penetrate into the groove 25. In the same manner, the tubular part 7 is provided with an outer keyway groove 27 which extends over the entire portion of the part 7 which is not covered by the attachment means 9 and which opens out to the face 7b of said part. In this way the collar 24 and the nut 23 forming the end wall 7a of the part 7 together constitute a shoulder defining the end of the groove 27. A key 28 projects into the inside of the sleeve 4 and is held in said sleeve by engaging in a lateral orifice provided for this purpose.

Figure 3:
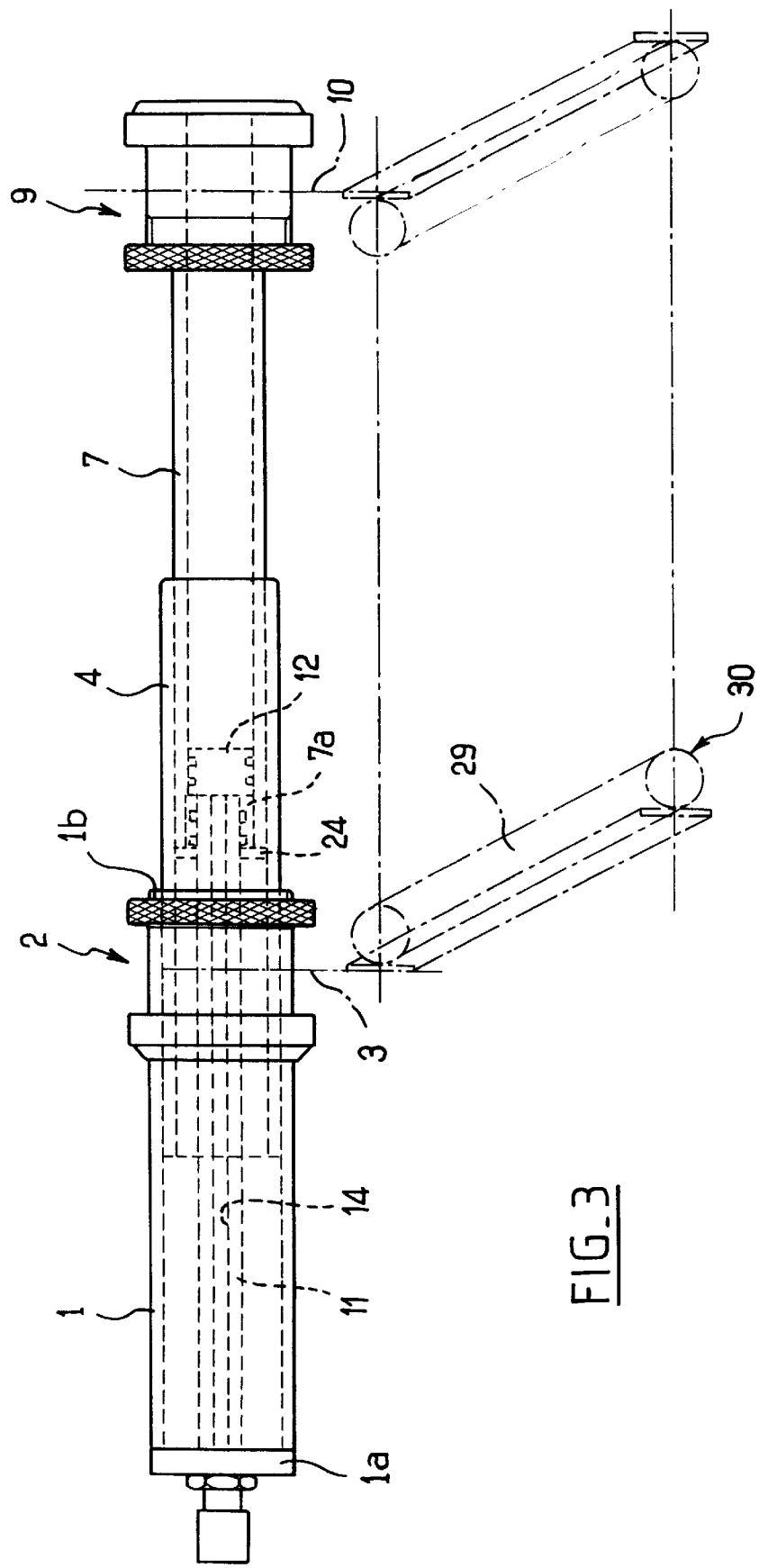
FIG. 3 is an outside view of the FIG. 2 device in its position of maximum extension.

The spring-compressor is extended by purging the chamber 13. When the compressor is to be put into place on a spring that is to be compressed, this extension is done by hand. When the collar 24 comes into abutment against the key 28, the sleeve 4 is entrained by the part 7. The sleeve comes partway out from the outer tubular part 1, as shown in FIG. 3, until the end wall 7a of the part 7 comes into contact with the piston 12. It will be observed in FIG. 3 in particular that when the part 7 is in this position of maximum extension, it is situated completely outside the part 1, and the two parts are connected together by the sleeve 4 in which the part 7 remains engaged to a considerable extent because of the position of the key 28, said sleeve itself remaining engaged inside the part 1. The role of the end 25a of the abutment 25 is to come into contact with the key 26 so as to prevent the sleeve 4 from coming fully out from the part 1, supposing the plug 24 forming the end wall 7a of the chamber 3 were to be detached from the tube 7 in untimely manner.

In the compressor of the invention, traction forces are taken up by the rod 11, whereas buckling forces are taken up by the tubular parts 7, 4, and 1.

I claim:

1. A hydraulic spring-compressor comprising a body formed by a first tubular part (1) closed at one of its ends by an end wall (1a) in which there is received the end of a hollow rod (11) extending axially inside the first tubular part (1) and whose other end is shaped to form a piston (12), and by a second tubular part (7) having an end closed by an end wall (7a) through which the hollow rod (11) passes, which second tubular part is mounted to slide in sealed manner on the rod (11) and the piston (12), defining therebetween a chamber (13) of variable volume that is continuously in communication with the inside volume (14) of the hollow rod (11), the first tubular part (1) having on its outside surface, at its end remote from the end wall (1a), attachment means (2) for attaching to a compression cup (3), the second tubular part (7) having on its outside surface, at its end remote from its end wall (7a), attachment means (9) for attachment to a compression cup (10), wherein the hollow rod (11) is longer than the first tubular part (1) so that its piston-shaped end (12) is situated beyond the attachment means (2) carried by the first tubular part (1), wherein the closed end (7a) of the second tubular part (7) is situated outside the attachment means (2) of the first tubular part (1) when the variable volume chamber (13) is at its minimum volume, wherein a link sleeve (4) is slidably mounted between the first and second tubular parts (1, 7) respectively on the inside and outside surfaces thereof, and wherein a key and keyway assembly (24, 27, 28) is interposed between the second part (7) and the sleeve (4) to guide respective longitudinal sliding thereof and to form shoulders that come into contact with each other to entrain the sleeve (4) axially by the second part (7) when the variable volume chamber (13) has exceeded a determined longitudinal size.

2. A compressor according to claim 1, wherein the sleeve (4) or the first part (1) has a longitudinal groove (25) in which there is received a radial finger (26) carried by the first part (1) or the sleeve (4), respectively.

3. A compressor according to claim 1, wherein the end wall (7a) of the second tubular part through which the rod (11) passes is formed by a nut screwed internally to the end of said second part (7) and possessing a collar (24) for bearing against an end face (7b) of said part into which there opens out a longitudinal groove (27) formed in the outside of the second tubular part (7), said collar (24) constituting the above-mentioned shoulder for driving a radial key (28) carried in fixed manner by the sleeve (4) and mounted to slide in the groove (27).

* * * * *